United States Patent [19]
Maeda

[11] Patent Number: 5,251,143
[45] Date of Patent: Oct. 5, 1993

[54] APPARATUS FOR GENERATING NUMERICAL CONTROL PROGRAMS WHICH GENERATE NO UNDERCUTTING AND NO CUTTING REMAINDER

[75] Inventor: Takeharu Maeda, Niwa, Japan

[73] Assignee: Kabushiki Kaisha Okuma Tekkosho, Aichi, Japan

[21] Appl. No.: 623,618

[22] Filed: Dec. 7, 1990

[30] Foreign Application Priority Data
Dec. 8, 1989 [JP] Japan .................................. 1-319352

[51] Int. Cl.$^5$ ..................... G05B 19/18; G05B 19/405
[52] U.S. Cl. .......................... 364/474.18; 364/474.14; 364/474.2; 364/191
[58] Field of Search ...................... 364/474.18, 474.14, 364/474.18, 474.2, 474.35, 191

[56] References Cited
U.S. PATENT DOCUMENTS

| | | | |
|---|---|---|---|
| 4,533,286 | 8/1985 | Kishi et al. | 364/474.18 |
| 4,572,998 | 2/1986 | Nozawa et al. | 364/474.18 |
| 4,608,645 | 8/1986 | Niwa et al. | 364/474.18 |
| 4,659,265 | 4/1987 | Kishi et al. | 364/474.18 |
| 4,837,703 | 6/1989 | Kakazu et al. | 364/474.18 |
| 4,907,164 | 3/1990 | Guyder | 364/474.2 |

Primary Examiner—Jerry Smith
Assistant Examiner—Paul Gordon
Attorney, Agent, or Firm—Wenderoth, Lind & Ponack

[57] ABSTRACT

An NC program generating apparatus corrects the start and end points of a machining command with suitable patterns obtained by automatic judgement, as well as checking whether or not interference with the part shape occurs to thereby easily form an NC program which is free of collision, excessive or insufficient cutting or the generation of fins.

1 Claim, 15 Drawing Sheets

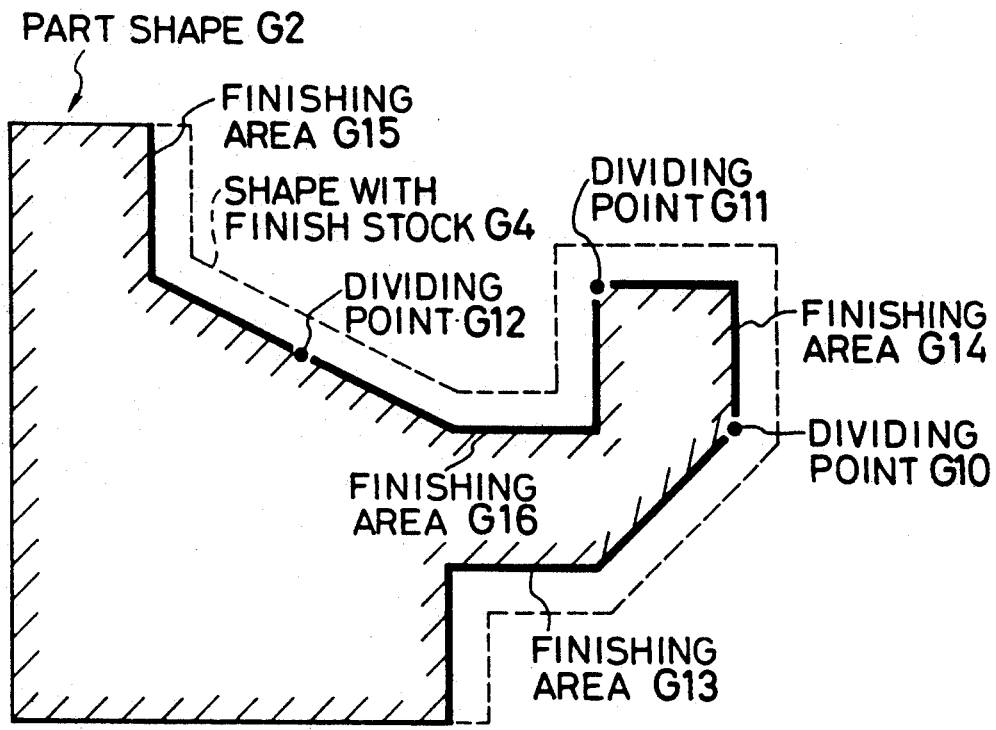
F I G. 5
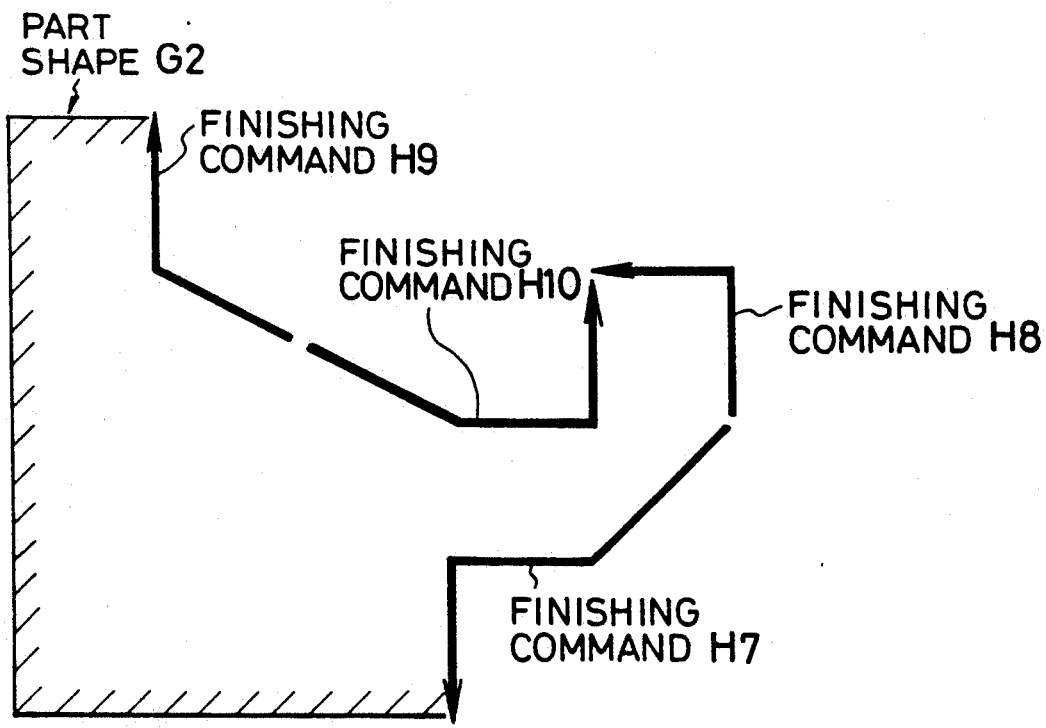
F I G. 6

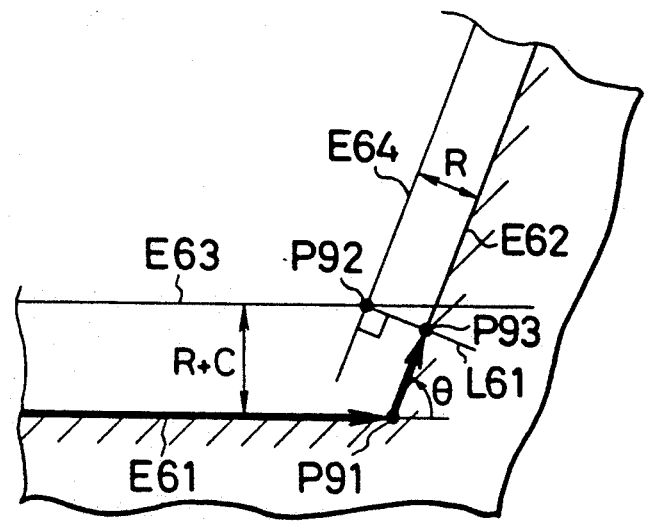
F I G. 17
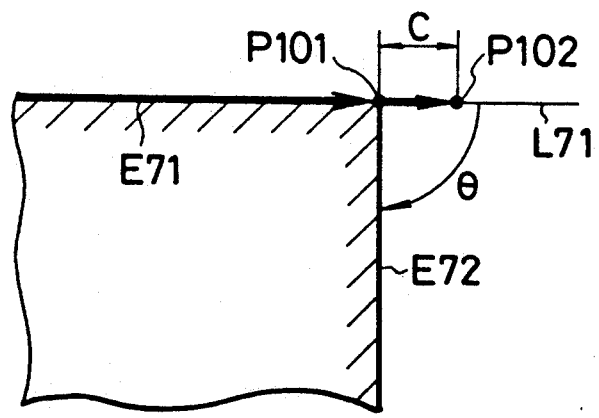
F I G. 18

APPARATUS FOR GENERATING NUMERICAL CONTROL PROGRAMS WHICH GENERATE NO UNDERCUTTING AND NO CUTTING REMAINDER

BACKGROUND OF THE INVENTION

This invention relates to a numercial control (NC) program generating apparatus which generates an NC program of machining commands suitable for finishing or roughing machining.

FIG. 1, consisting of FIGS. 1A and 1B, is a block diagram illustrating an embodiment of a prior art NC program generating apparatus which comprises an input means such as a keyboard 1, a data processing section 2, a roughing step processing section 3, a finishing step processing section 4 and an NC program processing section 5.

In the data processing section 2, by manipulation of the keyboard 1 by an operator, a blank shape G1 such as the one shown in FIG. 2 is inputted to a blank shape inputting section 21, and the blank shape G1 is stored in a blank shape memory 22 as a pattern composed of a series of shape elements such as points, straight lines and arcs. By another manipulation on the keyboard 1 by the operator a part shape G2 of FIG. 2 is inputted to a part shape inputting section 25, and is stored in a part shape memory 26 as a pattern composed of a series of shape elements. By still another manupulation on the keyboard 1 by the operator, a finishing stock G3 is inputted to a shape with finishing with generating section 23 for forming a shape with finishing stock as shown in FIG. 2, and the part shape G2 which has been stored in the part shape memory 26 and the blank shape G1 which has been stored in the blank shape memory 22 are read out, and a shape G4 with finishing stock as shown in FIG. 2 is obtained by offsetting the part shape G2 by the finishing stock G3, and is stored in a shape with finishing stock memory 24. By the operator's manipulation of the keyboard 1, information on one or more tools which are required for machining is inputted to a tool information input section 27 and stored in a tool information memory 28. The information comprises tool the tool angle, lip angle, and tip radius, machining conditions such as cutting speed, feed speed and clearance, and tool number and tool correction number.

In the roughing step processing section 3, the shape G4 with finishing stock stored in the shape with finishing stock memory 24, the blank shape G1 in the blank shape memory 22 and the tool information in the tool information memory 28 are read out at a roughing area dividing section 31 to obtain a roughing area by subtracting the shape G4 with finishing stock from the blank shape G1, to be suitable divided into sections based on the tool information, and stored in a divided roughing area memory 32 for divided roughing area. The roughing area divided into sections as shown in FIG. 3 comprises the blank shape G1, the shape G4 with finishing stock, dividing lines G5 and G6, roughing areas G7, G8, and G9 for each roughing step and information on the tools to be used in each step, machining direction and order of the step. The roughing area divided into sections and stored in the dixide roughing area memory 32 is read out at a roughing command generating section 33 for each step, and roughing commands H1, H2 and H3 for each step of FIG. 4 are formed based on the read out information and are stored at a roughing command memory 34. Simultaneously, blank commands H4, H5 and H6 for each step are formed and stored at a blank command memory 35. In order to obtain the roughing command and the blank command for a particular step, the shape obtained by removing all the sections which are supposed to have been completed before the step in question from the roughing area divided into sections as shown in FIG. 3 is assumed as the shape before machining, and the shape obtained by removing from the above shape before machining the section to be machined by the step in question is assumed as the shape after machining. Among the boundary lines defining the section to be machined by the step in question, those included in the shape before machining are determined as the blank command while those included in the shape after machining are determined as the roughing command. In other words, among the boundary lines of the section to be machined by the step in question, the blank shape is considered as the blank command, and the shape with finishing stock is considered as the roughing command. Further, as for the adjacent sections divided by a dividing line, the dividing line is considered as the roughing command for the section which is completed first, and the same dividing line is considered as the blank command for the section to be completed later.

In the finishing step processing section 4, the part shape G2 stored at the part shape memory 26, the shape G4 with finishing stock stored at the shape memory 24, and the tool information stored at the tool information memory 28 are read out by a finishing area dividing section 41 to obtain the finishing area by subtracting the part shape G2 from the shape G4 with finishing stock. The finishing area is divided suitable based on the tool information, and stored in a divided finishing area memory 42 for a divided finishing area. As shown in FIG. 5, the divided finishing area comprises shapes G4 and G2, the dividing points G10, G11, G12, sections G13, G14, G15, G16 for respective finishing steps and information such as on tools to be used at respective steps, machining direction and order of step. These divided sections of the finishing area stored in the divided finishing area memory 42 are read out by a finishing command generating section 43 for forming finishing commands H7, H8, H9, H10 for each step as shown in FIG. 6 and stored in a memory 44 for finishing command. When zero is inputted as the finish stock to the shape generating section 23, the finishing step processing section 4 is not actuated and hence, no machining command is formed.

In the NC program processing section 5, the roughing commands H1, H2, and H3 stored in the roughing command memory 34 and the blank commands H4, H5, and H6 stored in the blank command memory 35 are read out in the order of the steps by an NC program generating section 51 to form NC programs for the roughing cycle which feeds a cutter for a given amount repeatedly toward a machining area designated by the roughing command and the blank command and for the tip radius correction function which gives a command to move the tool so that the cutter tip of the tool having a certain radius comes to contact with the designated path, to be stored at an NC program memory 52. The finishing commands H7, H8, H9, and H10 stored in the finishing command memory 44 are read out in the order of the steps by the NC program generating section 51 to form NC programs for instructing the finishing and tip radius correction function to be stored in the NC program memory 52. The formed NC programs are outputted to a suitable medium such as a magnetic disc 6, a printer 7 or a paper tape 8 via an NC program outputting section 53. The roughing cycle and the tip radius correction function will now be described below.

As shown in FIG. 7, when the NC programs for the finishing command H11 comprising the points P1 through P4 and for the tip radius correction function are inputted to an NC machining system which machines works in accordance with such NC programs, a tool is positioned at the position T1, and a virtual circle S of the cutter tip with a radius R which is the tip radius and a center TC is moved in contact with the path designated by the finishing command H11 to complete the machining at the position T4 via the position T3.

As shown in FIG. 8, when the NC program instructing the roughing cycle comprising the roughing command H12 composed of the points P11 through P15 and the blank command H13 composed of the points P11, P16, P15 and the tip radius correction function are inputted, the work is machined based on the cut depth D, the tip radius R and the clearance C along the tool path CP1 composed of the points P24, P22 and P15, the tool path CP2 composed of the points P23, P21, P13, P14 and P22 and the tool path CP3 composed of the points P11, P12, P13, P14 and P15 sequentially. The movement of the tool along the paths is similar to the one described in relation to FIG. 7 for the finishing command H11.

However, the prior art NC program information generating system is not free of defects. Because machining and blank commands are formed by extracting from the boundary lines of divided sections in a machining area, a tool tends to collide with the shape before machining when the tool is positioned at the start or the ene point of a machining command, the work is cut too deep where the shape after machining has an inward bend, fins are produced where the shape after machining has an outward bend, or the work is not cut sufficiently when the machining command includes dividing lines.

SUMMARY OF THE INVENTION

This invention was conceived to obviate aforementioned defects encountered in the prior art and aims at providing and NC program generating apparatus which can automatically form an NC program capable of excellent machining. According to one aspect of this invention, for achieving the objects described above, a numerical control program generating apparatus is provided for generating numerical control programs for machining commands by dividing a machining area determined by the shape upon completion of machining and the shape before machining that are inputted, and for generating a tip radius correction function which moves a tool having a tip with a predetermined radius in a manner to make said tip come to contact with a path designated by said machining command, which is provided with a means for correcting terminal points of said machining command so as not to produce machining defects caused by the tip shape of said tool.

According to another aspect of this invention, a numerical control program generating apparatus is provided for generating numerical control programs for shape commands upon completion of and before machining by dividing a machining area determined by the shape upon completion of machining and the shape before machining that are inputted, for instructing the roughing cycle which repeatedly cuts by a predetermined feed the machining area designated by said shape commands upon completion and before machining, and for generating a tip radius correction function which moves a tool having a tip with a predetermined radius in a manner to make the tip thereof contact with the designated path, which is provided with a means for correcting the terminal points in the shape commands upon completion of and before machining so as not to produce defects which caused by the tip shape of said tool during machining.

The object of the present invention may also be effected by providing an apparatus for generating numerical control programs which cause no undercutting and no cutting remainder comprising:

a blank shape memory for storing a blank shape;

a shape with finish stock memory for storing a part shape added to a finish stock;

a part shape memory for storing a part shape; a tool information memory for storing tool information;

a data processing section for inputting data to said blank shape memory, said shape with finish stock memory, said part shape memory and said tool information memory through an inputting means;

a roughing area dividing section for dividing an area which is defined by the blank shape stored in said blank shape memory and the shape stored in said shape with finish stock memory and which is to be removed by roughing, into plural areas;

a divided roughing area memory for storing the roughing areas divided by said roughing area dividing section;

a roughing command generating section for generating a roughing command and a blank command based on the area stored in said divided roughing area memory;

a roughing command memory for storing said roughing command generated by said roughing command generating section;

a blank command memory for storing said blank command generated by said roughing command generating section;

a finishing area dividing section for dividing the shape stored in said part shape memory;

a divided finishing area memory for storing the shapes divided by said finishing area dividing section;

a finishing command generating section for generating a finishing command based on the shape stored in said divided finishing area memory;

a finishing command memory for storing the finishing command generated by said finishing command generating section;

a roughing step correcting section for respectively generating a corrected roughing command and a corrected blank command from the roughing command stored in said roughing command memory and the blank command stored in said blank command memory, said roughing step correcting section including means for selectively:

(1) extending a start point of a roughing command stored in said roughing command memory by a length of the tip radius stored in said tool information memory in a tangential direction of the roughing command;

(2) extending a start point of a roughing command stored in said roughing command memory by a length of the tip radius stored in said tool information memory along the shape stored in said part shape memory when the extended path of the start point interferes with the shape stored in said part shape memory;

(3) offsetting a straight line command, wherein the start point of the roughing command stored in said roughing command memory is included, by a distance of the tip radius stored in said tool information memory in a direction toward the outside of the area to be roughed by said roughing command formed in said divided roughing area memory when said straight line command is on a dividing line of mutual areas formed in said divided roughing area memory by said roughing area dividing section, simultaneously extending the start point of the blank command stored in said blank command memory by a length of said tip radius along the shape stored in said blank shape memory;

(4) storing the corrected roughing command and the corrected blank command;

a corrected roughing command memory for storing said corrected roughing command formed by said roughing step correcting section;

a corrected blank command memory for storing said corrected blank command formed by said roughing step correcting section;

a finishing step correcting section for forming a corrected finishing command from the finishing command stored in said finishing command memory, said finishing step correcting section including means for selectively:

(1) extending a start point of a finishing command stored in said finishing command memory by a length of the tip radius stored in said tool information memory in a tangential direction of the finishing command;

(2) extending a start point of a finishing command stored in said finishing command memory by a length of the tip radius stored in said tool information memory along the shape stored in said part shape memory when the extended path of the start point interferes with the shape stored in said part shape memory;

(3) extending a start point of a finishing command stored in said finishing command memory so as to be outside of the shape stored in said shape with finishing stock memory, when the extended path of the start point is inside of the shape stored in said shape with finishing stock memory;

(4) extending a end point of a finishing command stored in said finishing command memory by a length of the tip radius stored in said tool information memory in a tangential direction of the finishing command;

(5) extending a end point of a finishing command stored in said finishing command memory by a length of the tip radius stored in said tool information memory along the shape stored in said part shape memory when the extended path of the start point interferes with the shape stored in said part shape memory;

(6) storing the corrected finishing command;

a corrected finishing command memory for storing said corrected finishing command formed by said finishing step correcting section; and an NC program processing section for generating a NC program according to the machining commands stored in said corrected roughing command memory, said corrected blank command memory and said corrected finishing command memory, and for outputting said NC program onto a storage medium.

The nature, principle and utility of the invention will become more apparent from the following detailed description when read in conjunction with the accompanying drawings.

BRIEF DESCRIPTION OF THE DRAWINGS

In the accompanying drawings:

FIGS. 2, 3, 4, 5, 6, 7, and 8 are views respectively showing examples of processing by the prior art NC program generating system;

FIGS. 11, 12, 13, 14, 15, 16, 17, and 18 are views to respectively showing specific examples of operations of the NC program generating system according to this invention.

DESCRIPTION OF THE PREFERRED EMBODIMENT

Figure 1A:
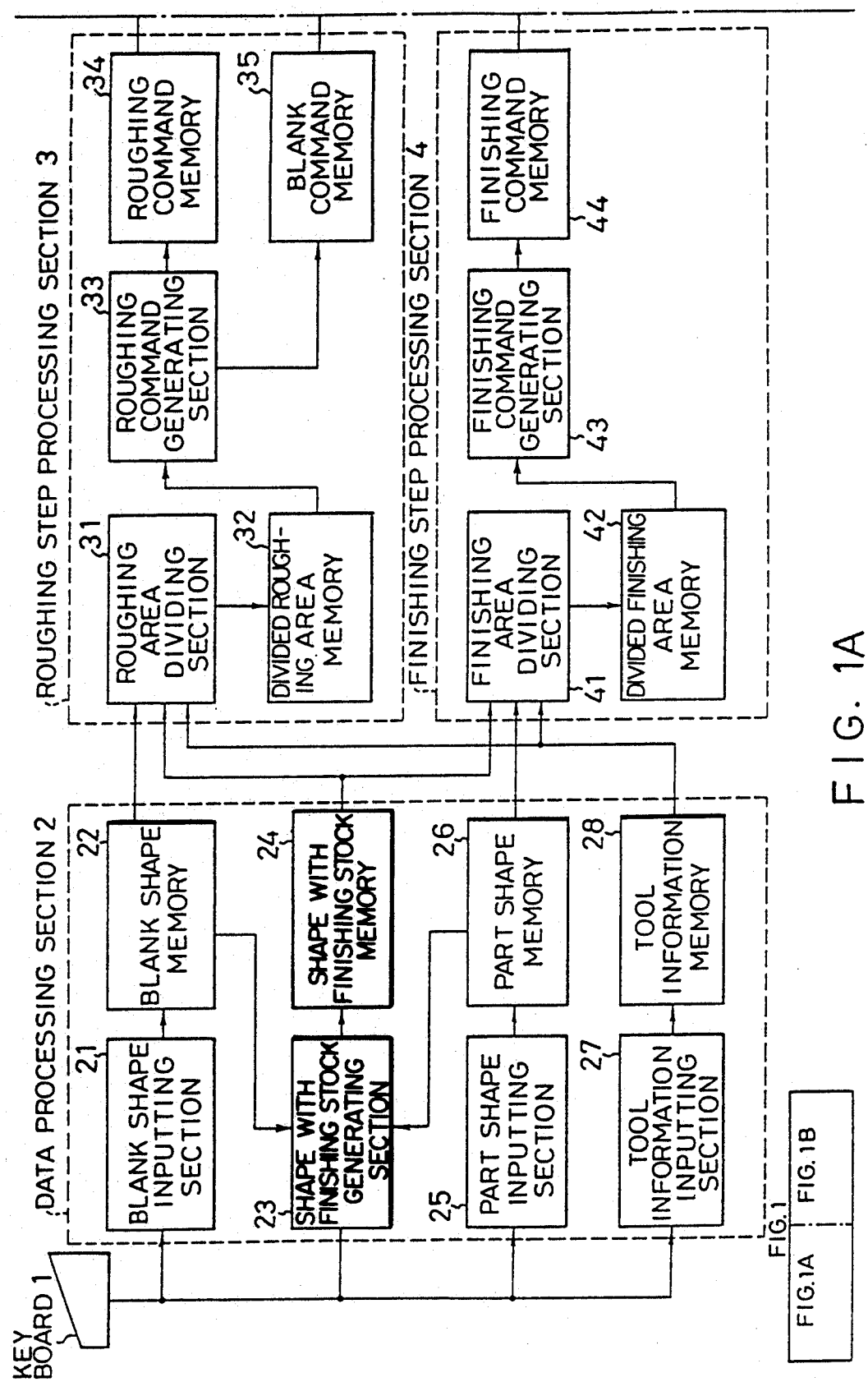
FIG. 1, consisting of FIGS. 1A and 1B is a block diagram illustrating an embodiment of a prior art NC program generating system.
Figure 1B:
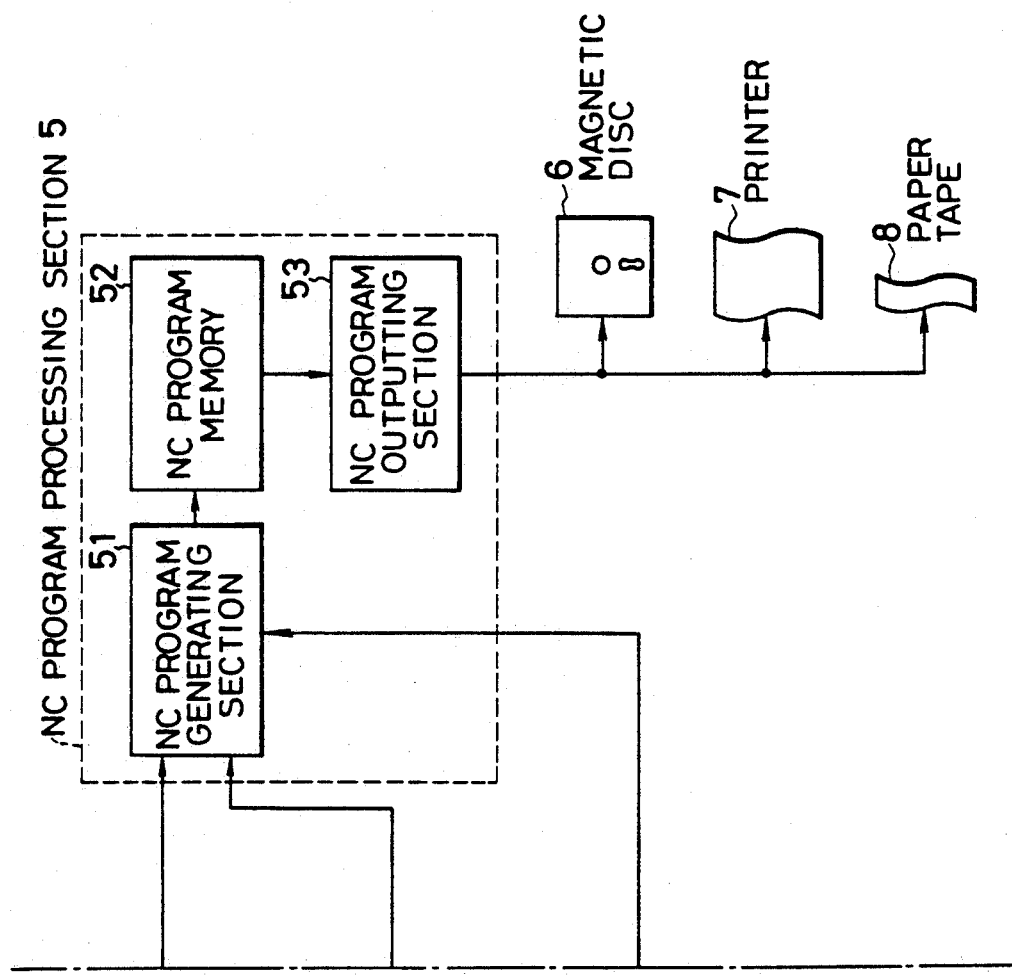
Figure 2:
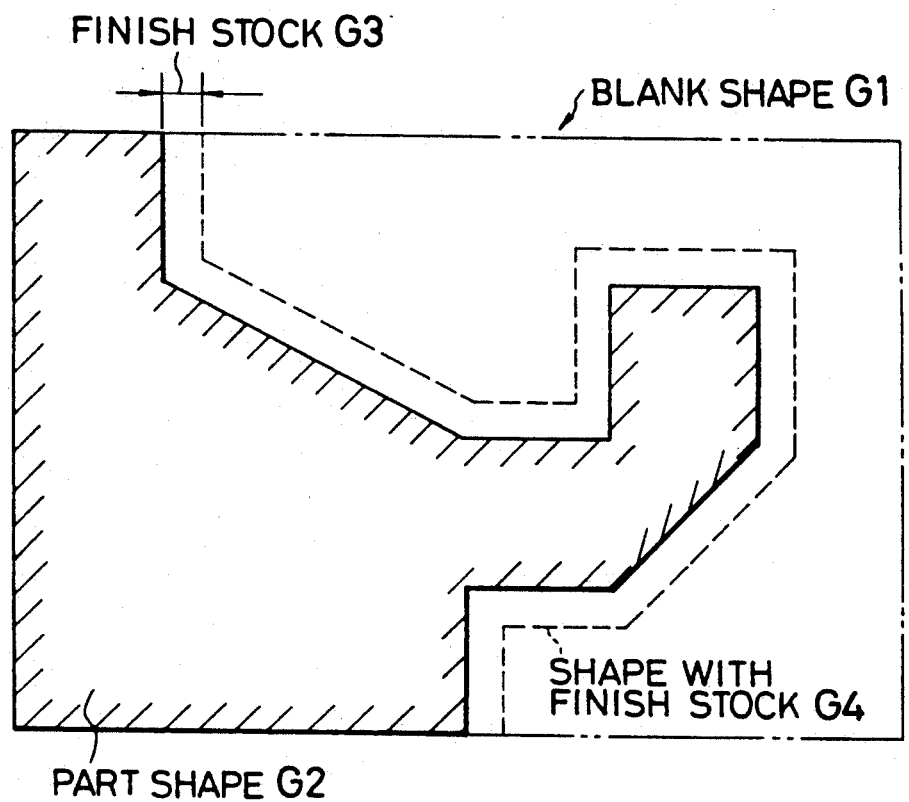
Figure 9A:
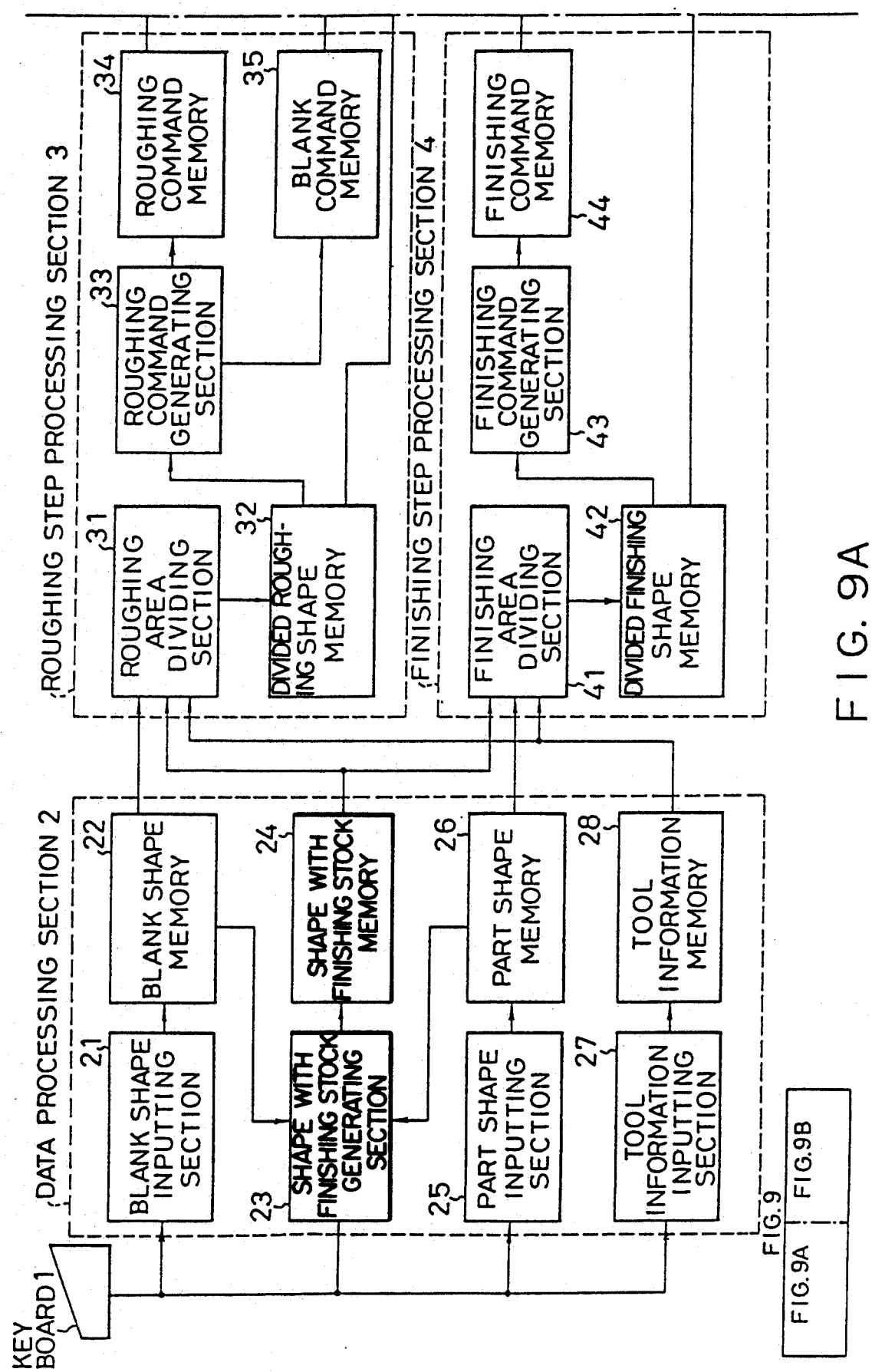
FIG. 9, consisting of FIGS. 9A and 9B is a block diagram illustrating an embodiment of the NC program generating system according to this invention.
Figure 9B:
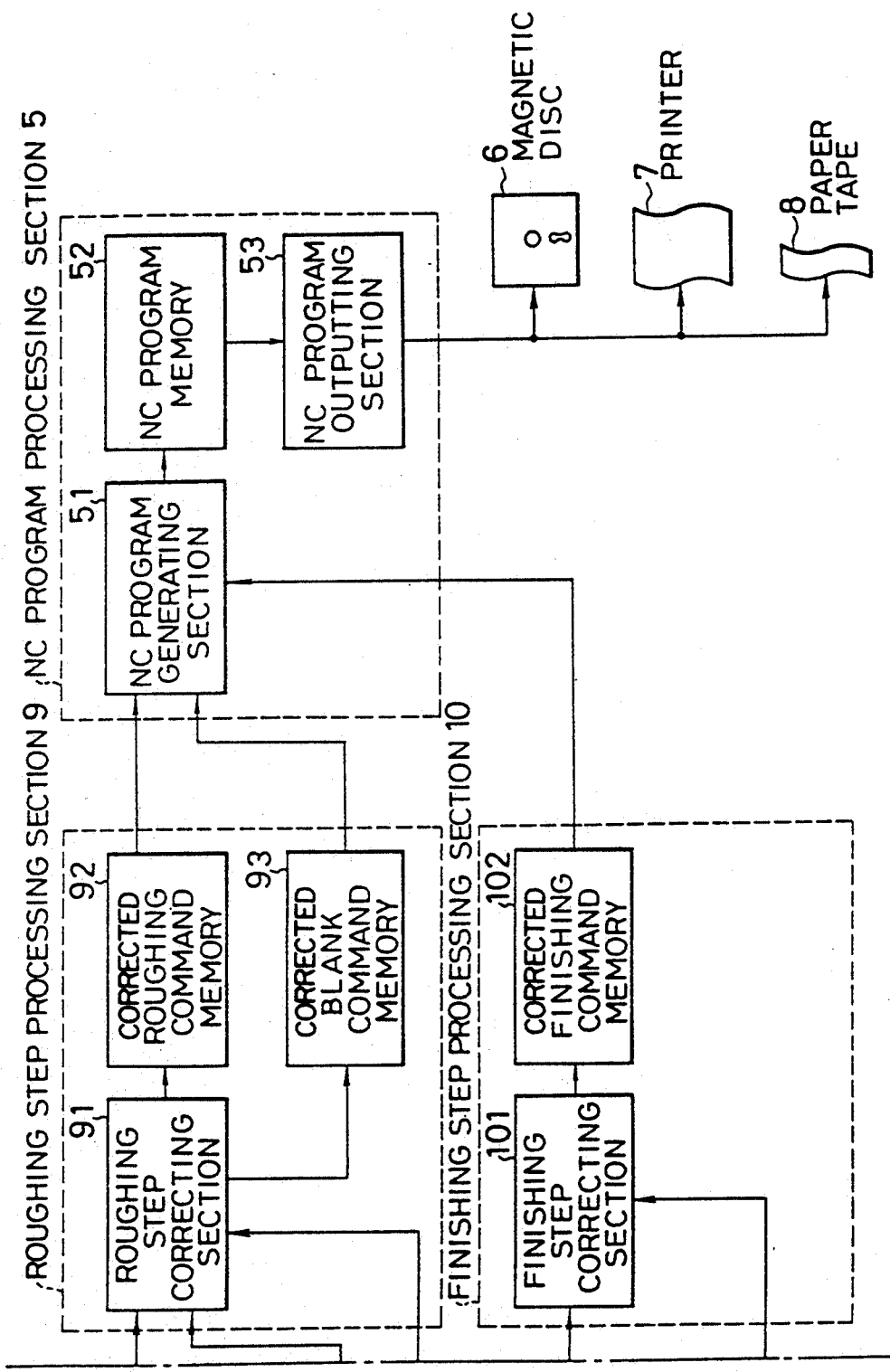

FIG. 9 shows an embodiment of an NC program generating system according to this invention in correspondence to FIG. 1 and the same part components are denoted by the same reference numerals to eliminate duplication in description. The NC program generating system comprises an input means such as a keyboard 1, a data processing section 2, a roughing step processing section 3, a finishing step processing section 4, and an NC program processing section 5, a roughing step processing section 9 and a finishing step processing section 10.

In the roughing step processing section 9, the roughing command stored in the roughing command memory 34, the blank command stored is in the blank command memory 35, and the divided roughing area stored in the divided roughing shape memory 32 are read out in the order of the machining steps by the roughing step correcting section 91, and correction is made based on the above data for the start and end points of the roughing command and the blank command as terminal point correcting process which will be described later. The thus corrected roughing commands are stored in the order of the steps in the corrected roughing command memory 92 while the corrected blank command are stored in the order of the steps in the corrected blank command memory 93.

In the finishing step processing section 10, the finishing commands stored in the finishing command memory 44, and divided finishing area stored in the divided finishing shape memory 42 are read out in the order of the steps by the finish step correcting section 101, and based on these data, the terminal point correction is made on the start and end points of the finishing commands, and the corrected finishing commands are stored in the order of the steps at the finishing command memory 102.

The terminal point correcting processing herein means a processing which solves problems which otherwise are caused at the start and end points of a machining command. More specifically, where a command might cause collision, the command is corrected to extend the path to outside of the shape before machining at the start point, or where the blank might be cut too deep, the command is corrected to extend the path along the shape if the shape after machining has an inward bend, or where fins might be produced, the command is corrected to extend the path in tangential direction if the shape after machining has an outward bend, or where the machining command includes dividing lines, the machining command is offset to prevent insufficient cutting.

Figure 10A:
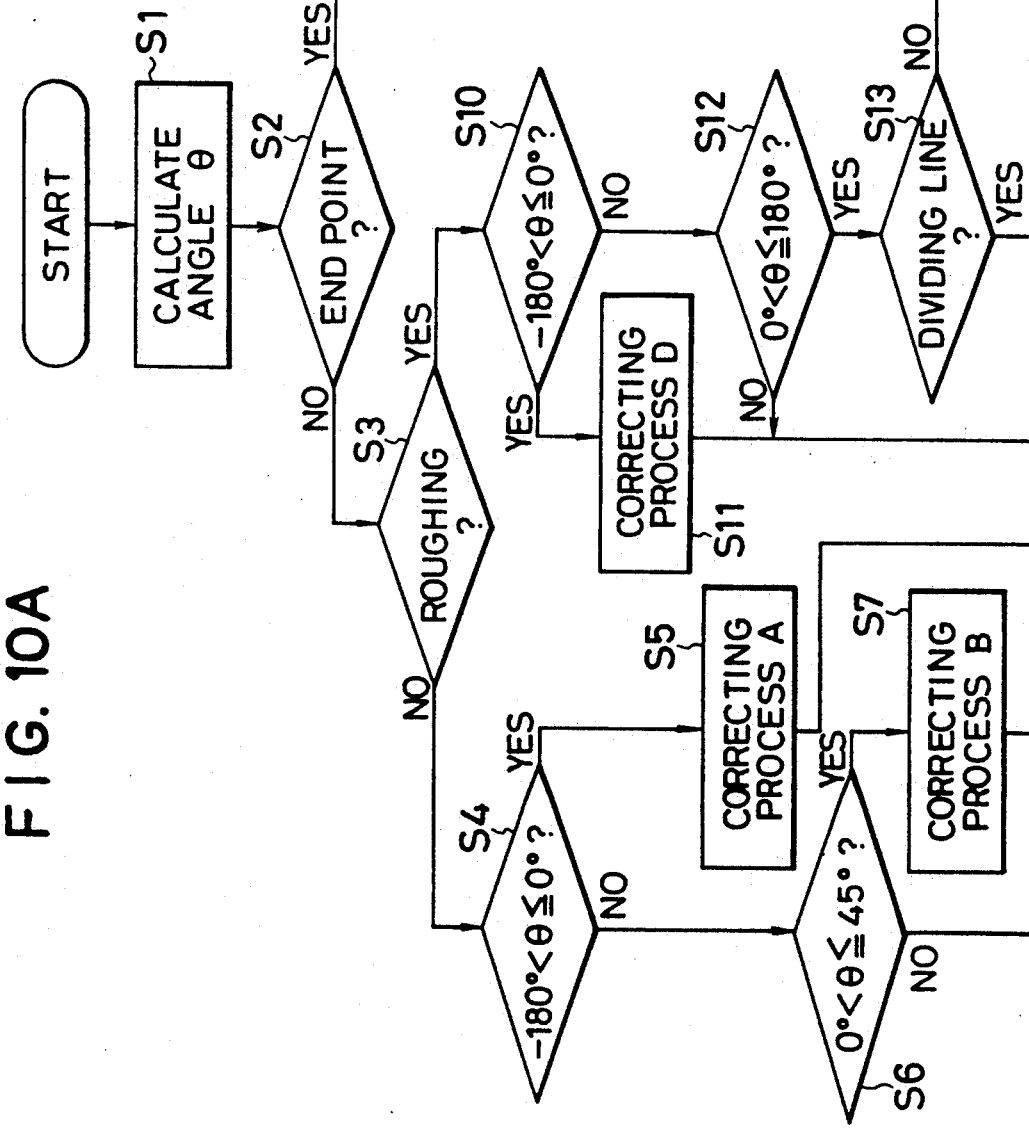
FIG. 10, consisting of FIGS. 10A and 10B is a flowchart illustrating the operation thereof.
Figure 10B:
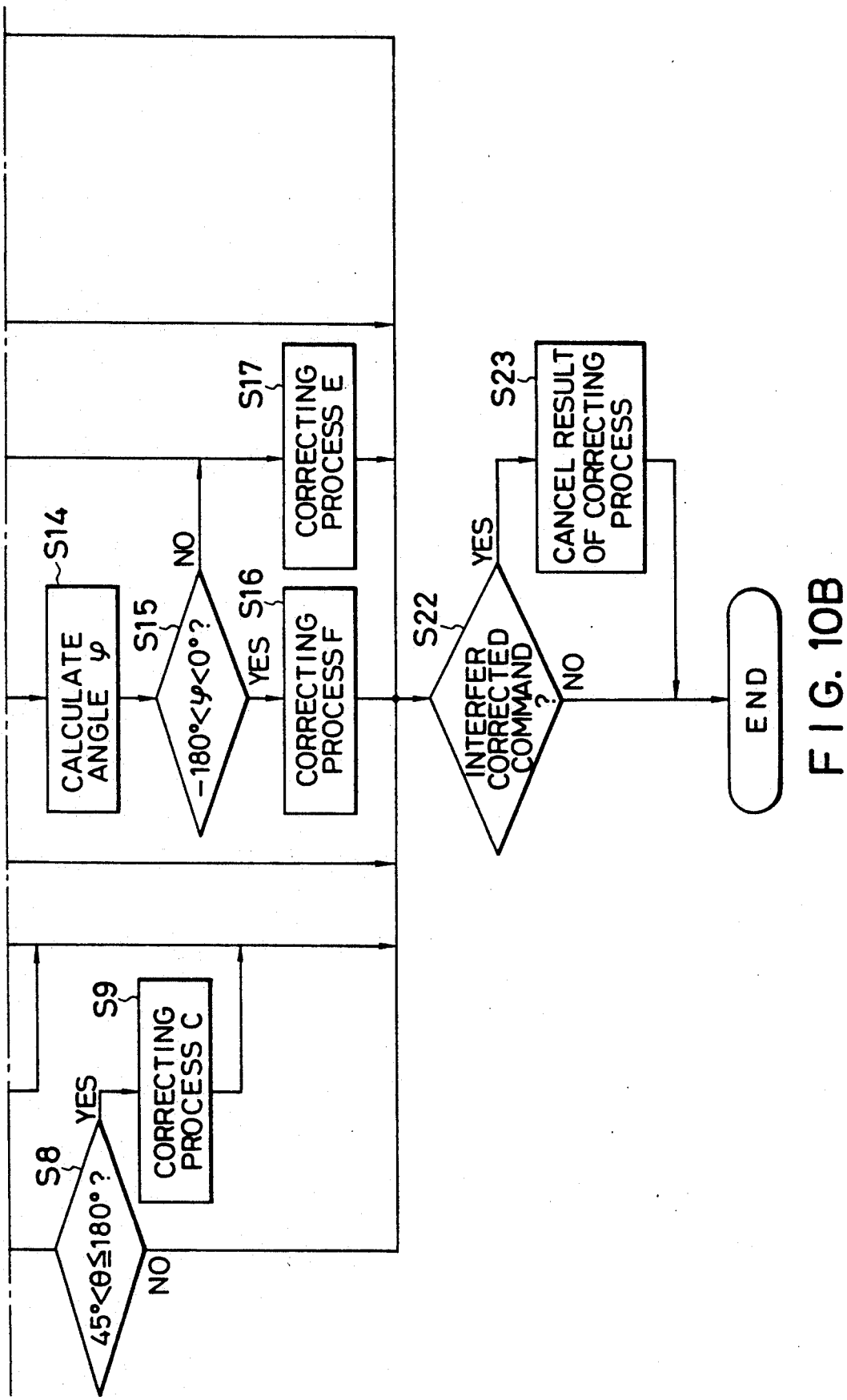

There may be various types of terminal point processings, and FIG. 10 shows an example by way of a flow-chart. First, the angle $\theta$ between the machining command and the shape after machining at a terminal point which is the subject of the processing is calculated as 0° when machining command and the shape after machining is command straight; and when the above connection is bent inwardly, it is determined as a negative angle; and when the above connection is bent outwardly, it is determined as a positive angle (Step S1). Then, a determination is made as to whether the particular terminal point is a start point or an end point in the machining command (Step S2). When the point is a start point of the machining command, a determination is made as to whether it is the start point for a roughing command or a finishing command (Step S3). If the particular point is the start point of a finishing command, the value of the angle $\theta$ is determined (Steps S4, S6, S8). One, of the correcting processes A, B or C is executed to extend the path to outside of the shape before machining in a corresponding manner depending on the angle $\theta$ (Steps S5, S7, S9).

When the terminal point is found to be the start point of a roughing command by the Step S3, the angle $\theta$ is determined (Steps S10, S12). When the connection is bent inwardly, the correcting process D is executed (Step S11). When bent outwardly, it is further determination is made as to whether or not the shape element of the machining command adjacent to the terminal point is a dividing line (Step S13). If it is not, the correcting process E is executed (Step S17).

When the shape element is determined to be a dividing line by the Step S13, the angle $\phi$ of the dividing line against the machining command is obtained similarly to the angle $\theta$ (Step S15). When the connection is bent inwardly, the correcting process F to offset the machining command is executed (Step S16), and when it is bent outwardly, the correcting process E is executed (Step S17).

When the terminal point is determined to be an end point of the machining command, the value of the angle $\theta$ is determined (Steps S18, S20). When it is bent inwardly, the correcting process G is executed to extend the machining command along the shape (Step S19). When it is bent outwardly, the correcting process H is executed to extend the machining command tangentially (Step S21).

When all the above correcting processes are completed, a determination is made as to whether or not the corrected machining command interferes with the part shape or the shape with finish stock (Step S22). If not, all the processes are completed. But if it interferes with the part shape or the shape with finish stock, the result of the correcting process is cancelled in order to avoid excessive cutting, and the machining command before correction is restored (Step S23) to complete the process.

Each of the correcting processes will now be described more specifically.

Figure 11:
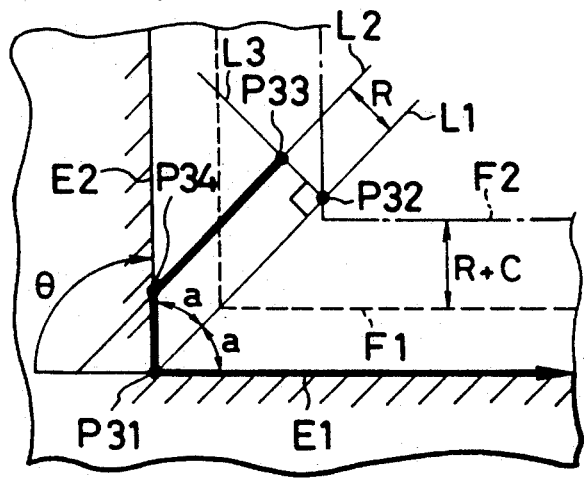

In the correcting process A (Step S5), based on the start point P31, the finishing command E1, the shape E2 after machining, and the shape with finish stock F1 of FIG. 11, the intersection P32 between the shape F2 which is offset from the shape F1 by the distance of (the tip radius R+the clearance C) and a straight line L1 which bisects the angle E1, P31, E2 into an angle a is obtained. Then, the intersection P33 of a straight line L3 which passes the point P32 and is normal to the straight line L1 with a straight line L2 which is displaced from the straight line L1 by the tip radius R, and the intersection P34 of the straight line L2 and the shape after machining E2 are obtained, and shape elements P33, P34 and P34, P31 are added to the finishing command. By this processing, since the center of the tip circle comes to the point P32 when the tool is positioned at the point P33, and since the clearance C can be reserved between the tool and the shape F1 with finish stock, collision can be prevented. Simultaneously, excessive cutting into the shape E2 after machining can be prevented at the start point P31.

Figure 12:
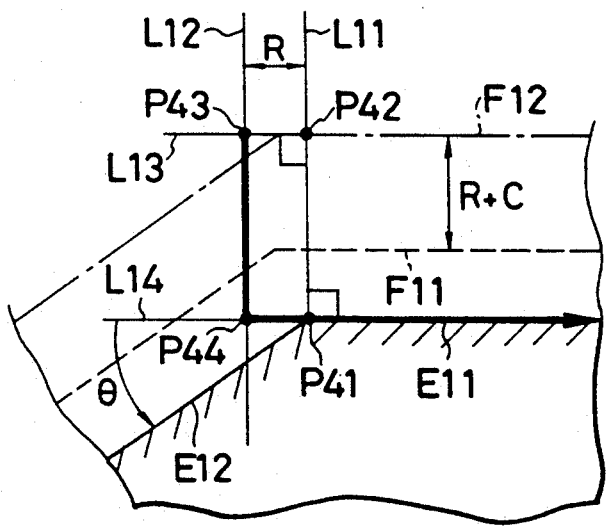

In the correcting process B (Step S7), based on the start point P41, the finishing command E11, the shape E12 after machining, and the shape with finish stock F11 in FIG. 12, the intersection P42 of the shape F12 which is offset from the shape F11 by the distance of (the tip radius R+the clearance C) with a straight line L11 which passes a start point P41 and is normal to the finishing command E11 is obtained. Then, the intersection P43 of a straight line L13 which passes the point P42 and is normal to the straight line L11 with the straight line L12 which is displaced from the line L11 by the tip radius R, and the intersection P44 of the straight line L12 with a tangential line L14 of the finishing command E11 are obtained. The shape elements P43, P44 and P44, P41 are added to the finishing command. By this processing, the clearance C can be maintained to avoid collision at the time of positioning the tool at the point P43.

Figure 13:
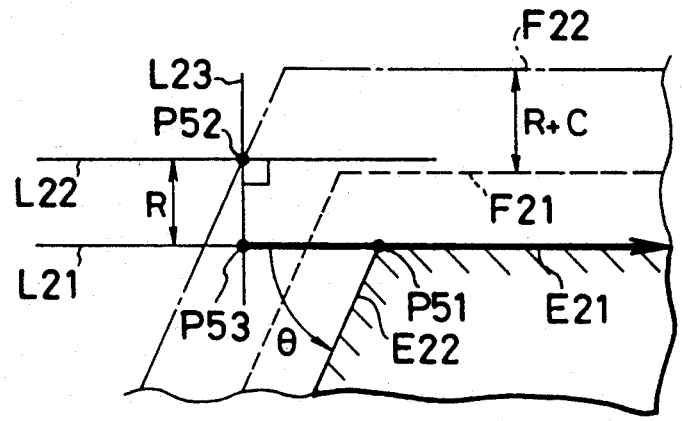

In the correcting process C (Step S9), based on the start point P51, the finishing command E21, the shape E22 after machining, and the shape with finish stock F21 in FIG. 13, the intersection P52 of the shape F22 which is offset from the shape F21 with finish stock by (the radius R+the clearance C) with a straight line L22 which is displaced from the tangent L21 of the finishing command E21 by the tip radius R is obtained. Then, the intersection P53 of a straight line L23 which passes the point P52 and is normal to the straight line L22 with the straight line L21 is obtained. The shape element P53, P51 is added to the finishing command. By this processing, the clearance C can be maintained to prevent collision at the time of positioning the tool at the point P53.

Figure 14:
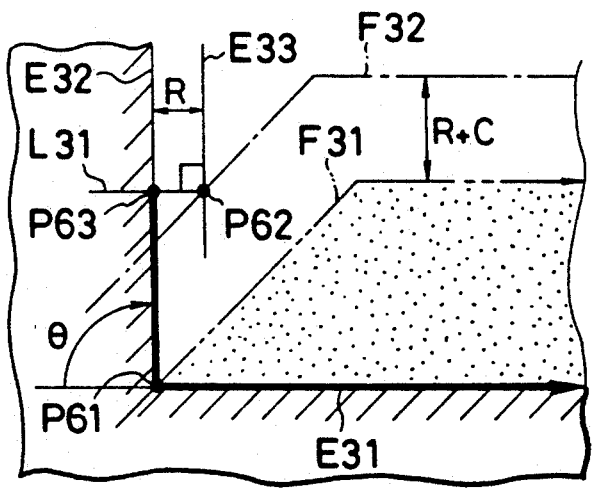

In the correcting process D (Step S11), based on the start point P61, the roughing command E31, the E32 shape after machining, and the blank command F31 in FIG. 14, the intersection P62 of the shape F32 which is offset from the blank command F31 by the distance of (the tip radius R+the clearance C) with the shape E33 which is offset from the shape E32 after machining by the tip radius R, and the intersection P63 of a straight line L31 which passes the point P62 and is normal to the shape E33 with the shape E32 after machining are obtained. The shape element P63, P61 is added to the roughing command. As a result of this processing, the center of the tip circle comes to the point P62 at the time of positioning the tool at the point P63, and the clearance C can be maintained between the tool and the blank command F31 to prevent the collision. At the same time, the excessive cutting into the shape E32 after machining can be prevented at the start point P61.

Figure 15:
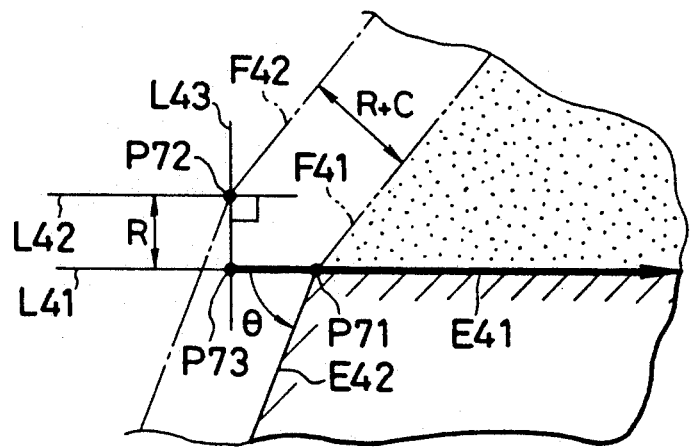

In the correcting process E (Step S17), based on the start point P71, the roughing command E41, the shape E42 after machining and the blank command F41 in FIG. 15, the intersection P72 of the shape F42 which is offset from the blank command F41 and from the shape E42 after machining by the distance of (the tip radius R+the clearance C) with a straight line L42 which is displaced from the tangent L41 of the roughing command E41 by the tip radius R, and the intersection P73 of a straight line L43 which passes the point P72 and is normal to the line L42 with the line L41 are obtained. The shape element P73, P71 is added to the roughing command. By this processing, the clearance C can be reserved to prevent the collision at the time of positioning the tool at the point P73.

Figure 16:
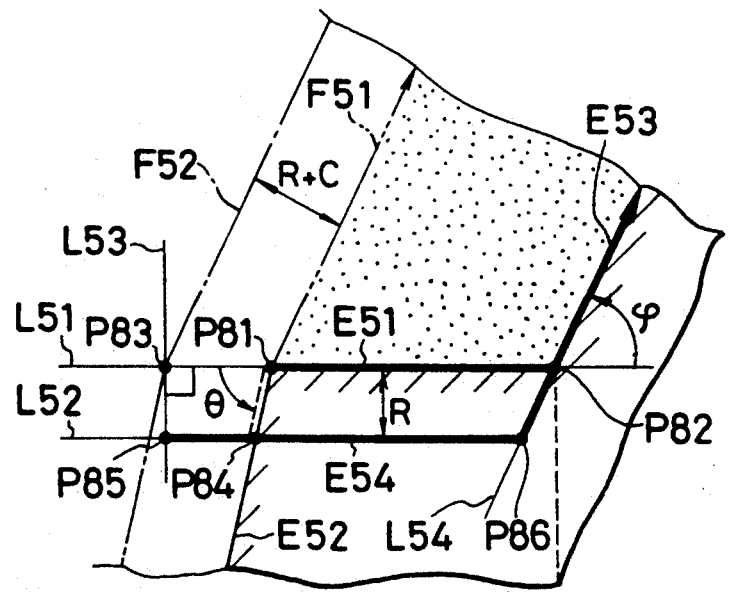

In the correcting process F (Step S16), based on the start point P81, the dividing line E51 which is a shape element in the roughing command E53, the connection point P82 of the dividing line E51 with the roughing command E53, the shape E52 after machining and the blank command F51 in FIG. 16, the intersection P83 of the shape F52 which is offset from the blank command F51 and from the shape E52 after machining by (the tip radius R+the clearance C) with the tangent L51 of the dividing line E51 is obtained. The intersection P84 of the shape element E54 which is offset from the dividing line E51 by the tip radius R with the shape E52 after machining, and the intersection P85 of the tangent L52 of the shape element E54 at the point P84 and the straight line L53 which passes the point P83 and is normal to the line L51 are obtained. The intersection P86 of the tangent L54 of the roughing command E53 at the point P82 and the shape element E54 is obtained. The dividing line E51 is deleted from the roughing command, and the shape elements P85, P84 and P84, P86 and P86, P82 are added while the shape element P84, P81 is added to the blank command. This processing secures the clearance C to avoid the collision at the time of positioning the tool at the point P85. Further, insufficient cutting at the point P82 is prevented.

In the correcting process G (Step S19), based on the end point P91, the machining command E61 and the shape E62 after machining in FIG. 17, the intersection P92 of the shape E63 which is offset from the machining command E61 by the distance of (the tip radius R+the clearance C) with the shape E64 which is offset from the shape E62 after machining by the tip radius R, and the intersection P93 of a straight line L61 which passes the point P92 and is normal to the shape E64 with the shape after machining are obtained, and the shape element P91, P93 is added to the machining command. By this processing, excessive cutting into the shape E62 after machining is prevented.

In the correcting process H (Step S21), based on the end point P101, the machining command E71, and the shape E72 after machining in FIG. 18, a point P102 is obtained by extending the machining command in the direction of its tangent L71 by the distance equivalent to the clearance C, and the shape elements P101, P102 are added to the machining command. This processing prevents fins from being produced at the point P101.

An example of NC program generating processing according to this invention will now be described.

Figure 3:
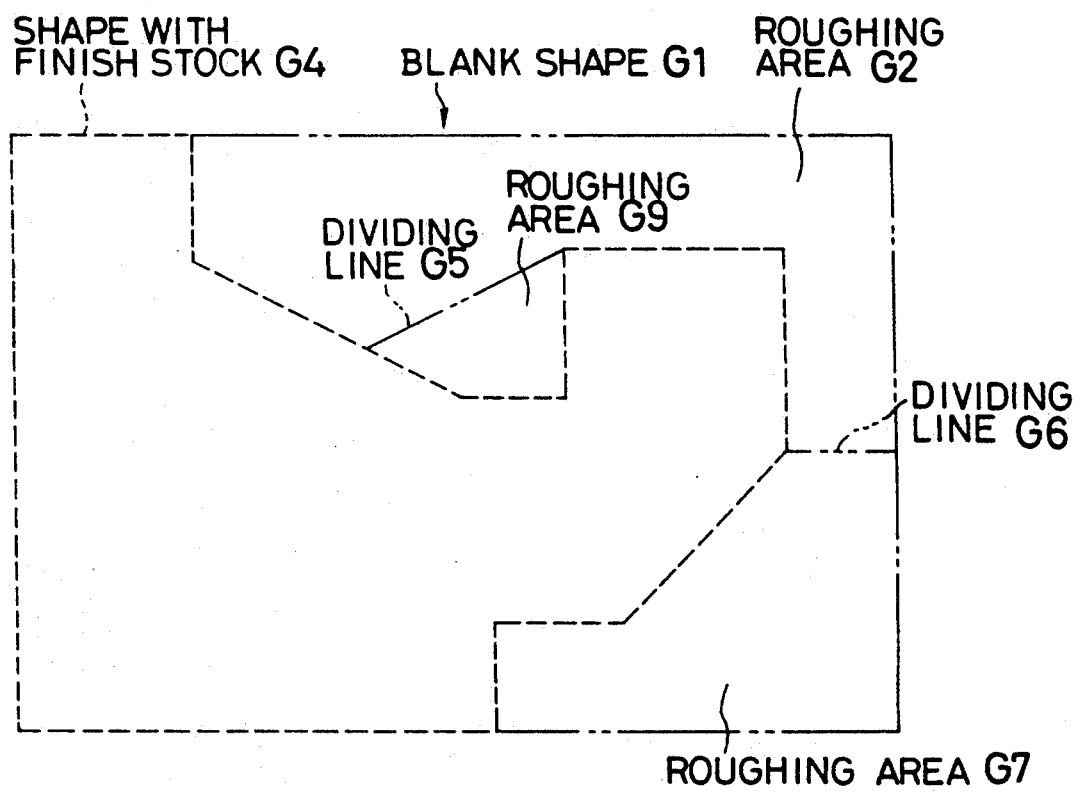
Figure 4:
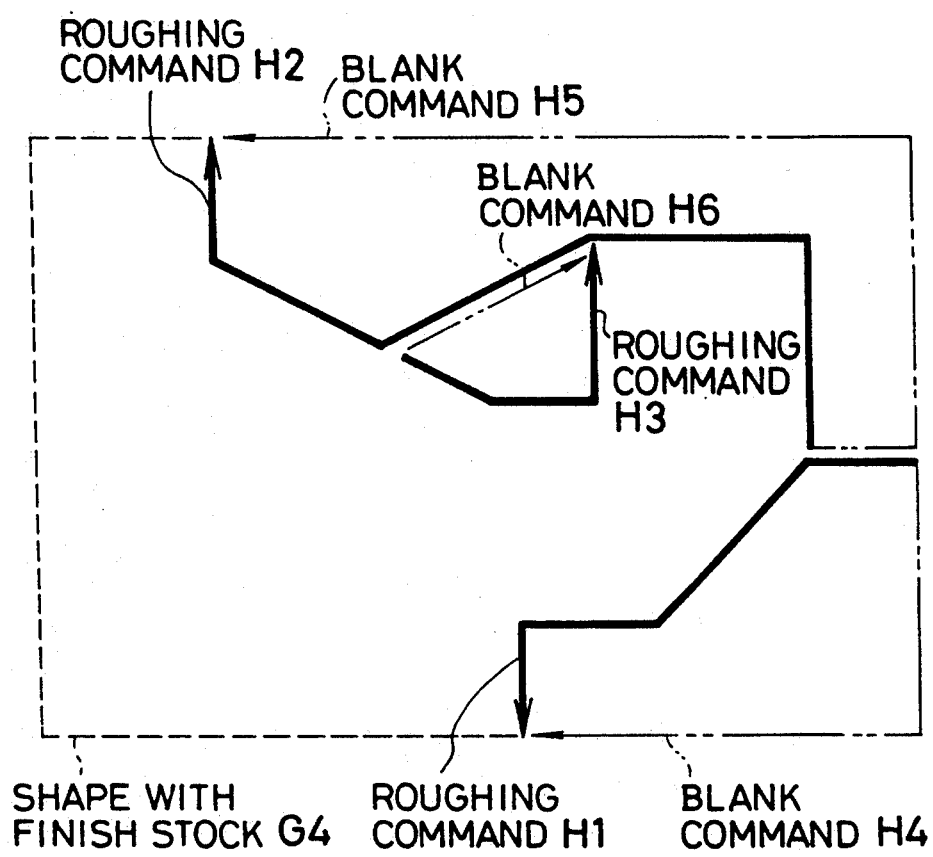
Figure 7:
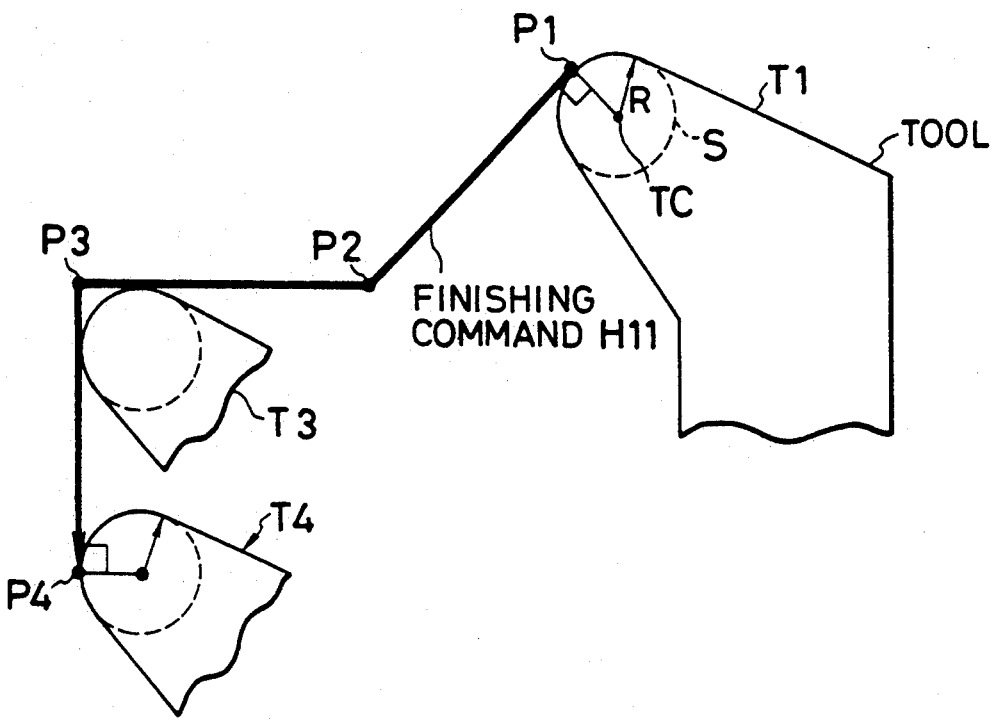
Figure 8:
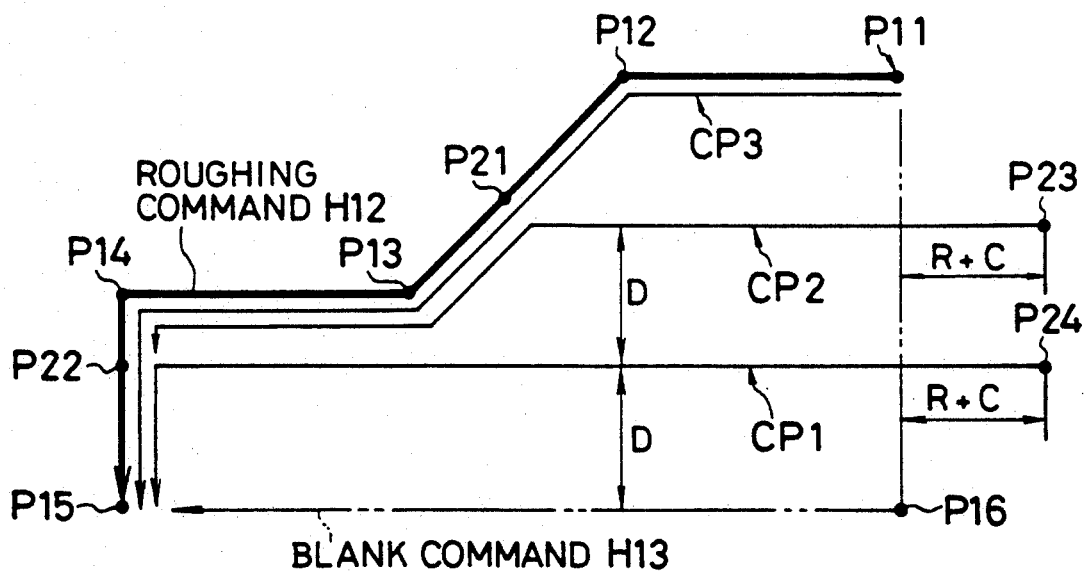
Figure 20:
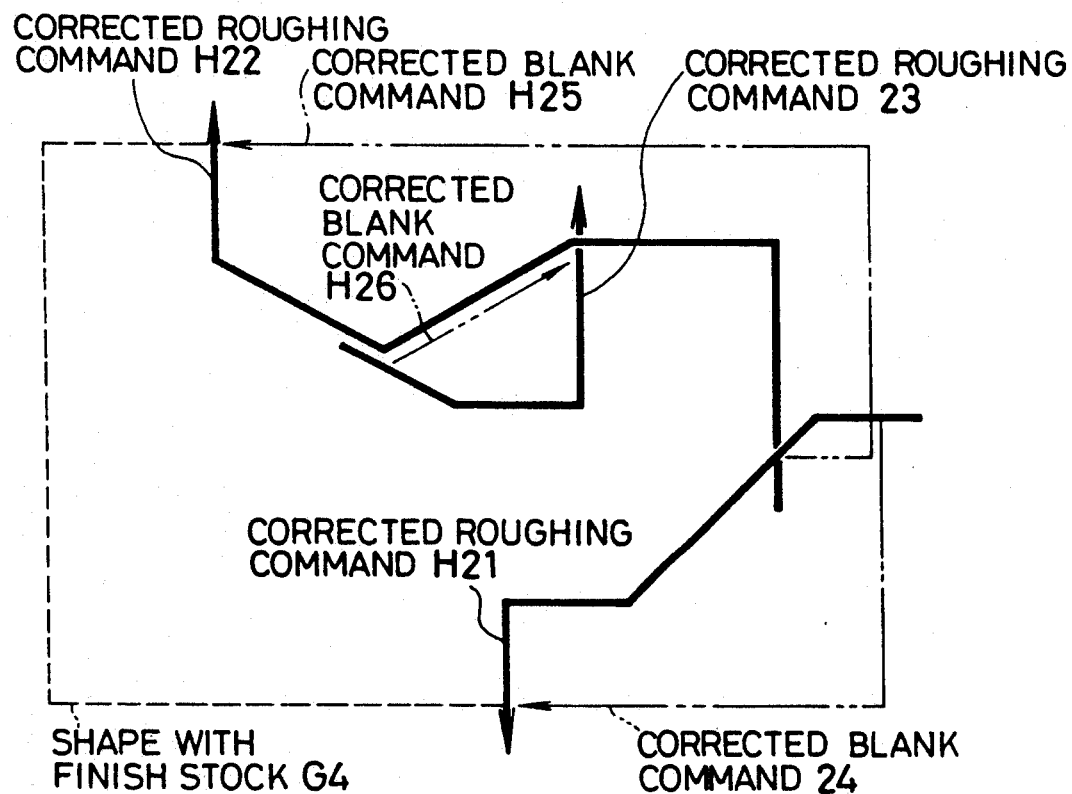

When the divided sections of the roughing area, the roughing command and the blank command shown in FIG. 3, are read out by the roughing step correcting section 91 of FIG. 9, the correcting process F is applied for the start point in the roughing command H1 shown in FIG. 4 while the correcting process H is applied to the end point to obtain corrected roughing command H21 as shown in FIG. 20. The blank command H4 shown in FIG. 4 is corrected similarly by the correcting process F for the start point to obtain corrected blank command H24. The roughing command H2 shown in FIG. 4 is corrected by the correcting process E for the start point thereof, and by the correcting process H for the end point thereof to obtain the corrected roughing command H22 shown in FIG. 20. The blank command H5 shown in FIG. 4 remains uncorrected and is used as is as the corrected blank command H25 in FIG. 20. The roughing command H3 shown in FIG. 4 is corrected by the correcting process D for the start point thereof and by the correcting process H for the end point thereof to obtain the corrected roughing command H23 of FIG. 20. The blank command H6 in FIG. 4 remains corrected and used as it is as the corrected blank command H26 in FIG. 20.

Figure 19:
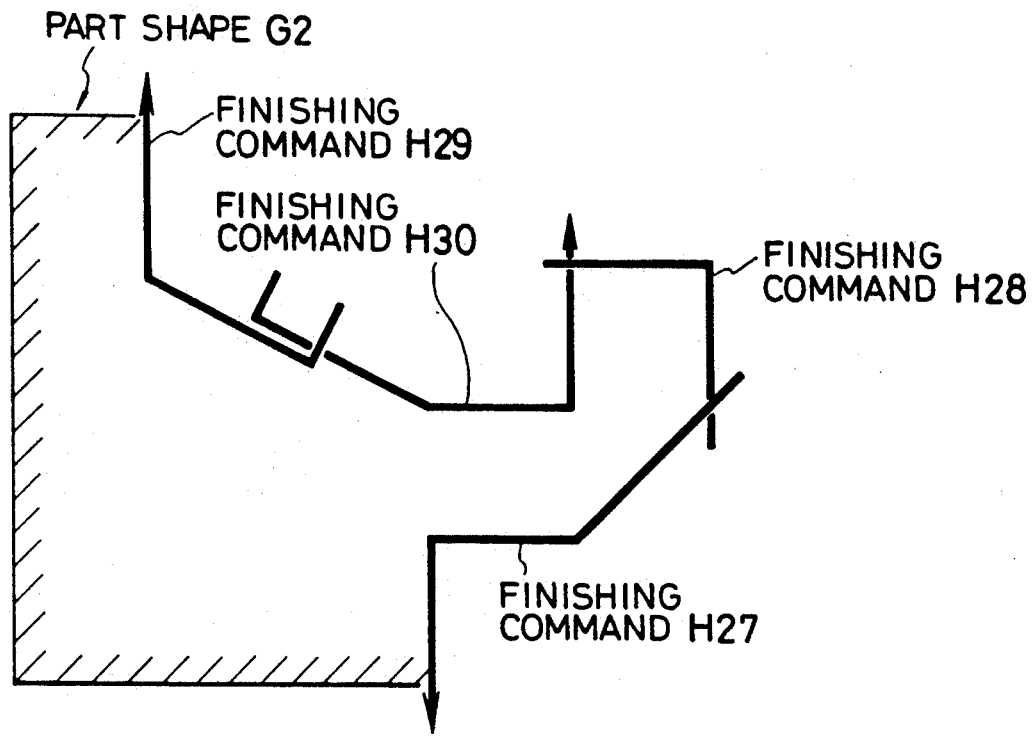
FIGS. 19 and 20 are views explaining specific processing examples by this invention.

When the divided sections in the finishing area shown in FIG. 5 and the finishing area in FIG. 6 are read out by the finishing step correcting section 101 of FIG. 9, the finishing command H7 of FIG. 6 is corrected by the correcting process C for the start point and by the correcting process H for the end point thereof to obtain the corrected finishing command H27 as shown in FIG. 19. Similarly, the finishing command H8 shown in FIG. 6 is corrected to obtain the finishing command H28 as shown in FIG. 19.

The finishing command H9 as shown in FIG. 6 is corrected by the correcting process A for the start point thereof and by the correcting process H for the end point to obtain the corrected finishing command H29 as shown in FIG. 19. Similarly, the finishing command H10 of FIG. 6 is corrected to obtain the finishing command H30 as shown in FIG. 19.

The NC program generating system according to this invention can easily form an NC program which would not cause collision, excessive cutting, insufficient cutting or fins to thereby greatly improve durable life of tools and the quality of products.

It should be understood that many modifications and adaptations of the invention will become apparent to those skilled in the art and it is intended to encompass such obvious modifications and changes in the scope of the claims appended hereto.

What is claimed is:

1. An apparatus for generating numerical control programs which cause no undercutting and no cutting remainder comprising:
   a blank shape memory for storing a blank shape;
   a shape with finish stock memory for storing a part shape added to a finish stock;
   a part shape memory for storing a part shape; a tool information memory for storing tool information;
   a data processing section for inputting data to said blank shape memory, said shape with finish stock memory, said part shape memory and said tool information memory through an inputting means;

a roughing area dividing section for dividing an area which is defined by the blank shape stored in said blank shape memory and the shape stored in said shape with finish stock memory and which is to be removed by roughing, into plural areas;

a divided roughing area memory for storing the roughing areas divided by said roughing area dividing section;

a roughing command generating section for generating a roughing command and a blank command based on the area stored in said divided roughing area memory;

a roughing command memory for storing said roughing command generated by said roughing command generating section;

a blank command memory for storing said blank command generated by said roughing command generating section;

a finishing area dividing section for dividing the shape stored in said part shape memory;

a divided finishing area memory for storing the shapes divided by said finishing area dividing section;

a finishing command generating section for generating a finishing command based on the shape stored in said divided finishing area memory;

a finishing command memory for storing the finishing command generated by said finishing command generating section;

a roughing step correcting section for respectively generating a corrected roughing command and a corrected blank command from the roughing command stored in said roughing command memory and the blank command stored in said blank command memory, said roughing step correcting section including means for selectively:

(1) extending a start point of a roughing command stored in said roughing command memory by a length of the tip radius stored in said tool information memory in a tangential direction of the roughing command;

(2) extending a start point of a roughing command stored in said roughing command memory by a length of the tip radius stored in said tool information memory along the shape stored in said part shape memory when the extended path of the start point interferes with the shape stored in said part shape memory;

(3) offsetting a straight line command, wherein the start point of the roughing command stored in said roughing command memory is included, by a distance of the tip radius stored in said tool information memory in a direction toward the outside of the area to be roughed by said roughing command formed in said divided roughing area memory when said straight line command is on a dividing line of mutual areas formed in said divided roughing area memory by said roughing area dividing section, simultaneously extending the start point of the blank command stored in said blank command memory by a length of said tip radius along the shape stored in said blank shape memory;

(4) storing the corrected roughing command and the corrected blank command;

a corrected roughing command memory for storing said corrected roughing command formed by said roughing step correcting section;

a corrected blank command memory for storing said corrected blank command formed by said roughing step correcting section;

a finishing step correcting section for forming a corrected finishing command from the finishing command stored in said finishing command memory, said finishing step correcting section including means for selectively:

(1) extending a start point of a finishing command stored in said finishing command memory by a length of the tip radius stored in said tool information memory in a tangential direction of the finishing command;

(2) extending a start point of a finishing command stored in said finishing command memory by a length of the tip radius stored in said tool information memory along the shape stored in said part shape memory when the extended path of the start point interferes with the shape stored in said part shape memory;

(3) extending a start point of a finishing command stored in said finishing command memory so as to be outside of the shape stored in said shape with finishing stock memory, when the extended path of the start point is inside of the shape stored in said shape with finishing stock memory;

(4) extending a end point of a finishing command stored in said finishing command memory by a length of the tip radius stored in said tool information memory in a tangential direction of the finishing command;

(5) extending a end point of a finishing command stored in said finishing command memory by a length of the tip radius stored in said tool information memory along the shape stored in said part shape memory when the extended path of the start point interferes with the shape stored in said part shape memory;

(6) storing the corrected finishing command;

a corrected finishing command memory for storing said corrected finishing command formed by said finishing step correcting section; and an NC program processing section for generating a NC program according to the machining commands stored in said corrected roughing command memory, said corrected blank command memory and said corrected finishing command memory, and for outputting said NC program onto a storage medium.

* * * * *